US007530850B2

(12) United States Patent
Maguire et al.

(10) Patent No.: US 7,530,850 B2
(45) Date of Patent: May 12, 2009

(54) CIRCUIT DISCONNECT ASSEMBLY

(75) Inventors: Pax Maguire, Ann Arbor, MI (US); Venkateswa Sankaran, Farmington Hills, MI (US); Jacob Mathews, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/761,631

(22) Filed: Jun. 12, 2007

(65) Prior Publication Data

US 2007/0235313 A1 Oct. 11, 2007

Related U.S. Application Data

(62) Division of application No. 10/897,845, filed on Jul. 23, 2004, now Pat. No. 7,244,148.

(51) Int. Cl.
*H01R 13/68* (2006.01)
*H01R 33/95* (2006.01)

(52) U.S. Cl. .................. 439/620.28; 439/698; 439/830

(58) Field of Classification Search ................ 439/516, 439/620.21, 620.26, 620.27, 620.28, 620.29, 439/620.3, 620.33, 620.34, 698, 830
See application file for complete search history.

(56) References Cited

U.S. PATENT DOCUMENTS 945,017 A 1/1910 Cole
1,586,011 A 5/1926 Sloane
2,077,823 A * 4/1937 Carney ...................... 337/253
2,245,294 A 6/1941 Pelissier
3,480,898 A 11/1969 Giegerich
4,369,422 A * 1/1983 Rasmussen et al. ......... 337/248
4,484,185 A 11/1984 Graves
4,762,509 A 8/1988 Schaefer
5,034,620 A 7/1991 Cameron
5,135,410 A 8/1992 Kawase et al.
5,336,934 A 8/1994 Toepfer et al.
5,389,462 A 2/1995 Lin
5,562,490 A 10/1996 Rybolt et al.
5,700,165 A 12/1997 Harris et al.
5,744,873 A 4/1998 Hasagawa et al.
5,751,208 A 5/1998 Martinez
5,816,850 A 10/1998 Yamada et al.
5,850,909 A 12/1998 Wagner
5,971,801 A 10/1999 Kato et al.
6,215,636 B1 * 4/2001 Hellemans ................. 361/104
6,261,123 B1 7/2001 Kruger et al.
6,418,005 B1 * 7/2002 Endo et al. ................. 361/247

(Continued)

OTHER PUBLICATIONS

Patents Act 1977; Search Report under Section 17 dated Nov. 23, 2004 for Application No. GB0514454.8.

*Primary Examiner*—James Harvey
(74) *Attorney, Agent, or Firm*—Carlson, Gaskey & Olds PC

(57) ABSTRACT

A circuit disconnect assembly for a high-voltage electrical storage device in a vehicle includes a handle, a fuse and a detent. The handle is manually manipulated within a housing of a circuit between a locked position and an unlocked position. The fuse includes a first terminal and a second terminal which are moveable by the handle between the locked position to close the circuit and the unlocked position to open the circuit. The detent prevents shifting of the handle until a predetermined force is applied to the handle.

14 Claims, 4 Drawing Sheets

112a
121
250
121
120
104c
250
258
256
252
106c

U.S. PATENT DOCUMENTS

| | | | | |
|---|---|---|---|---|
| 6,491,534 | B1 | 12/2002 | Bonard et al. | |
| 6,614,203 | B2 | 9/2003 | Yuasa et al. | |
| 6,723,920 | B2 * | 4/2004 | Higuchi et al. | 174/50 |
| 6,727,797 | B1 | 4/2004 | Bruchmann | |
| 6,753,485 | B1 | 6/2004 | Tuniewicz | |
| 2002/0017405 | A1 | 2/2002 | Nada | |
| 2003/0003807 | A1 * | 1/2003 | Beer | 439/621 |
| 2003/0087542 | A1 | 5/2003 | Yamakawa et al. | |
| 2006/0019541 | A1 * | 1/2006 | Maguire et al. | 439/621 |

* cited by examiner 112
140
100
130
144
132
128
114
104a
132
134
124
134
212
210
142
212
126
129
138
210
106
102
116
121
121
110
104b
120
121
121
118

122

CIRCUIT DISCONNECT ASSEMBLY

This application is a divisional of U.S. application Ser. No. 10/897,845 filed Jul. 23, 2004 now U.S. Pat. No. 7,244,148.

TECHNICAL FIELD OF INVENTION

The present invention relates generally to electrical storage devices for vehicles, and more particularly to a service disconnect for a vehicle traction battery system.

BACKGROUND OF THE INVENTION

High-voltage electrical storage devices, such as high-voltage traction batteries, are used in electric, hybrid electric, and fuel cell vehicles. A high-voltage electrical circuit formed by the electrical storage device and a powertrain system connected to the storage device should be electrically isolated from the vehicle and the vehicle occupants at all times.

Traction batteries in today's electric and hybrid electric vehicles typically operate at voltages in excess of conventional accessory batteries. As such, service personnel require convenient and reliable techniques for opening the traction battery circuit and/or replacing fuses and other system components.

Currently known methods for opening a high-voltage electrical storage device and accessing the fuse tend to be cumbersome because they require multiple steps and components to remove the fuse. Therefore, there is a desire for a device that can reliably and expediently open the high-voltage circuit and allow replacement of a spent fuse in the high voltage circuit.

SUMMARY OF THE INVENTION

A circuit disconnect assembly for a high-voltage electrical storage device in a vehicle includes a handle, a fuse and a detent. The handle is manually manipulated within a housing of a circuit between a locked position and an unlocked position. The fuse includes a first terminal and a second terminal which are moveable by the handle between the locked position to close the circuit and the unlocked position to open the circuit. The detent prevents shifting of the handle until a predetermined force is applied to the handle.

An electrical storage device includes a housing and a disconnect assembly that is manually shiftable within the housing between and locked position and an unlocked position. The disconnect assembly includes at least one high voltage pin connected to a fuse. The disconnect assembly is adapted to operably connect the fuse in response to shifting the disconnect assembly between the locked position and the unlocked position. The high voltage pin is in communication with the electrical storage device in the locked position.

These and other features of the present invention can be best understood from the following specification and drawings, the following of which is a brief description.

DETAILED DESCRIPTION OF THE PREFERRED EMBODIMENT

Figure 1:
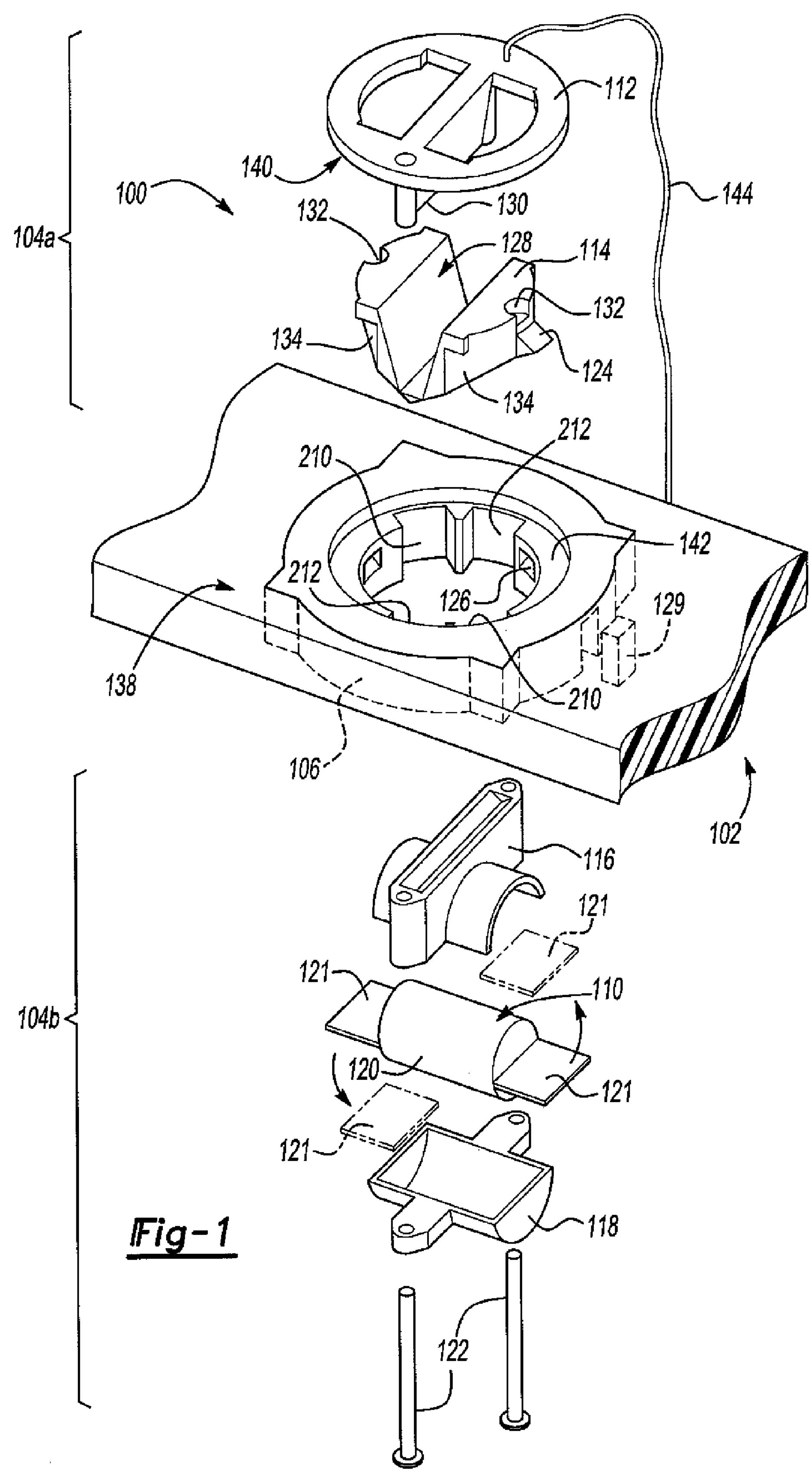
FIG. 1 is an exploded perspective view of an assembly according to one embodiment of the invention.

FIG. 1 is an exploded perspective view of a disconnect assembly 100 according to one embodiment of the invention. Generally, the disconnect assembly 100 is incorporated in a high-voltage electrical storage device 102 to quickly and reliably isolate high-voltage terminals in the device 102 from the rest of an electrical system, such as a high-voltage powertrain system (not shown) without removing a fuse from the device altogether in doing so. The disconnect assembly 100 also provides a convenient way to remove and service a spent fuse.

As shown in FIG. 1, the disconnect assembly 100 includes a handle that integrates an upper grip portion 104*a* and a lower fuse holder portion 104*b* together into a single unit. The handle is designed to engage with a housing 106 disposed on the electrical storage device. The housing 106 is fixed to or integral with the electrical storage device 102 and does not move relative to the electrical storage device 102, nor can it be removed when the handle is removed. Mating terminals 108 (e.g., FIGS. 4A and 4B) separate a series connections of circuit segments, such as electrochemical cells (not shown), inside the electrical storage device 102. The mating terminals 108 include one positive terminal and one negative terminal that can be connected together by a fuse 110. In one embodiment, the mating terminals 108 divide the series connections into two halves, thereby cutting the voltage across the mating terminals 108 by halfThis is preferable because it reduces the voltage to its lowest possible level when opening the circuit formed by the segments in only one location. The mating terminals 108 may be disposed in the housing 106 or in another structure in the electrical storage device 102.

The handle is designed to be retained securely in the housing 106 and hold a fuse 110 or other circuit connector in the fuse holder portion 104*b*. When the fuse 110 is connected to the mating terminals 108, current flows through the fuse 110 from the positive mating terminal to the negative mating terminal. If the current flowing through the fuse 110 reaches an excessively high level and/or flows for an excessive duration, the fuse 110 will burn open, opening the circuit and preventing further current flow between the mating terminals 108. Both the handle and the fuse 110 are serviceable items in the electrical storage device 102.

The grip portion 104*a* of the handle acts as a user interface to allow a worker to easily connect and disconnect the fuse 110 from the mating terminals 108. In one embodiment, the grip portion 104*a* and the fuse holder portion 104*b* can be shifted together via rotation or other movement into either a locked position, where the fuse 110 is connected to the mating terminals 108 so that the electrical storage device 102 is ready to operate, or a unlocked position, where the mating terminals 108 are open to prevent current flow and allow the high voltage powertrain and external portions of the electrical storage device 102 to be accessed. The grip portion 104*a* can be manually moved to and from either position without actually removing the handle or the fuse 110 from the housing 106. The examples described below illustrate various possible structures that allow engagement and removal of the handle, which includes both the grip portion 104*a* and the fuse holder portion 104*b*. Regardless of the specific structure, however, the handle should be designed to require application of moderate force (e.g., squeezing and/or pressing force) to disengage any detent in the handle and/or the housing 106 before it can be shifted free of the mating terminals 108 and, if needed, lifted out of the housing 106.

In the embodiment shown in FIG. 1, the grip portion 104*a* of the handle includes a handle body 112 and a retention feature 114. A fuse connector 116 couples the fuse 110 to the handle body 112 so that manual shifting of the handle body 112 will shift the fuse 110 as well. The fuse holder portion 104*b* of the handle includes a fuse retainer 118 that holds the fuse 110. As shown in FIG. 1, a body portion 120 of the fuse 110 is at least partially enclosed between the fuse connector 116 and the fuse retainer 118. Terminals 121 in the fuse 110 remain exposed outside the fuse connector 116 and the fuse retainer 118 in the handle so that they can connect to the mating terminals 108. Fasteners 122, such as through bolts, extend through the fuse retainer 118, the fuse connector 116, and the handle body 112 to connect them together so that they move as one unit. Each of these handle components will be described in greater detail below.

Both the grip portion 104*a* and the fuse holder portion 104*b* of the handle may be made of any suitable electrically-insulating material, such as plastic. To prevent the grip portion 104*a* from shifting too freely in the housing 106 or otherwise disengaging from the housing 106, the retention feature 114 has a detent to hold the grip portion 104*a* and/or the fuse holder portion 104*b* in the housing 106. In the embodiment shown in FIG. 1, the retention feature 114 includes at least one tab 124 designed to engage with at least one corresponding recess 126 in the housing 106. The retention feature 114 in this case is made of a resilient material and has a V-shaped groove 128 that accommodates a substantially planar projection 130 on the handle body 112.

When a worker applies a squeezing or pinching force on opposing depressions 132 of the retention feature 114, side walls 134 of the retention feature 114 move inward toward each other. The inward movement of the side walls 134 disengages the tab 124 on the retention feature 114 from the recess 126 in the housing 106, freeing the retention feature 114 to shift within the housing 106. The resiliency of the retention feature 114 causes the side walls 134 to move back outward when the tab 124 aligns with the recess 126 so that the tab 124 engages with the recess 126. Also, pulling upward on the handle body 112 when the tab 124 is not engaged with the recess 126 and when the fuse blades 121 are aligned with openings, such as a first set of fuse channels 210, in the housing 106 allows the grip portion 104*a* and the fuse holder portion 104*b,* therefore the fuse 110 encased therein, to be lifted out of the electrical storage device 102 for service.

Figure 2:
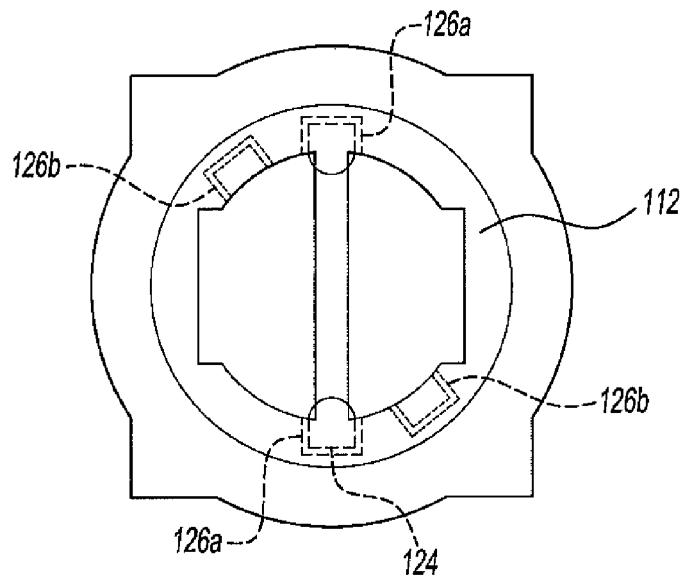
FIG. 2 illustrates one example of a top view of the assembly of FIG. 1.

As shown in FIG. 2, the retention feature 114 may have several tabs 124 opposite each other, and the housing 106 may have several pairs of corresponding recesses 126*a,* 126*b*. The tabs 124 engage a first set of recesses 126*a* when the handle (i.e., the grip portion 104*a* and the fuse holder portion 104*b*) and the fuse 110 are in the locked position and engage a second set of recesses 126*b* when the handle and the fuse 110 are in the unlocked position. The engagement between the tabs 124 and the recesses 126*a,* 126*b* prevent the grip portion 104*a* of the handle from shifting once it is placed in a designed position. Of course, it is possible to place the tabs on the housing and the recesses on the retention feature without departing from the scope of the invention.

A limit switch 129 may also be incorporated in the housing 106 near the recesses 126*a,* 126*b* and in communication with a processor (not shown). The tab 124 is configured so that it closes the limit switch 129 when it engages with one of the recesses 126*a,* 126*b,* allowing vehicle electronics to detect the position of the handle and the fuse 110 and confirm that it is inserted correctly in a selected position. The limit switch 129 may also act as a positive override of any system failure (e.g., failed software, electrical and/or mechanical systems) during storage and shipment of a damaged electrical storage device.

The engagement between the grip portion 104*a* of the handle and the housing 106 of the electrical storage device 102 can prevent an access cover 138 of the electrical storage device 102 from being removed unless the handle is removed first. In one embodiment, the retention feature 114 is held between a flange 140 on the handle and a flat portion 142 of the housing 106 when the handle is in the unlocked position and the locked position. Also, the fuse blades 121 are held securely between the mating terminals 108 to prevent the fuse 110 from being lifted out of the housing 106 from the locked position. As a result, the access cover 138 cannot be removed while the handle is connected to the housing 106.

The disconnect assembly 100 may be designed with a stowage feature so that the handle can be easily stowed in the service position to prevent it from becoming damaged or lost during service. For example, a tether 144 may be attached to the grip portion 104*a* and the housing 106. Alternatively, a second set of fuse channels 212 in the housing 106 may be included to allow the grip portion 104*a* and the fuse holder portion 104*b* of the handle to be inserted in a service position. The shape of the handle acts as the stowage feature in this case. In the service position, the fuse 110 is completely isolated from the mating terminals 108 and the grip portion 104*a* (and therefore the fuse 110) is not directly shiftable to either the unlocked or locked position. To move the handle back to the unlocked position so that is shiftable to the locked position, the fuse blades 121 are aligned with the second set of fuse channels 212 so that the handle can be completely removed from the housing 106 out of the service position. The fuse blades 121 are then aligned with the first set of fuse channels 210 and the handle is reinserted into the housing 106 in the unlocked position.

Figure 3A:
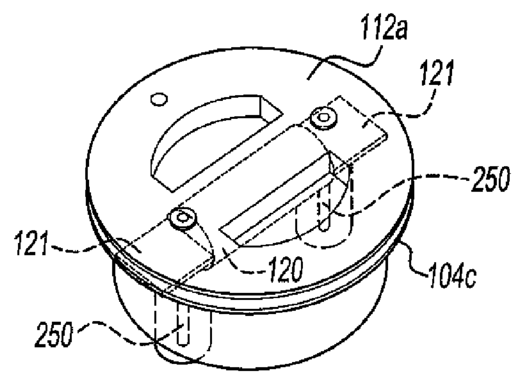
FIGS. 3A and 3B are a perspective view and a bottom plan view, respectively, of the assembly according to another embodiment of the invention.
Figure 3A:
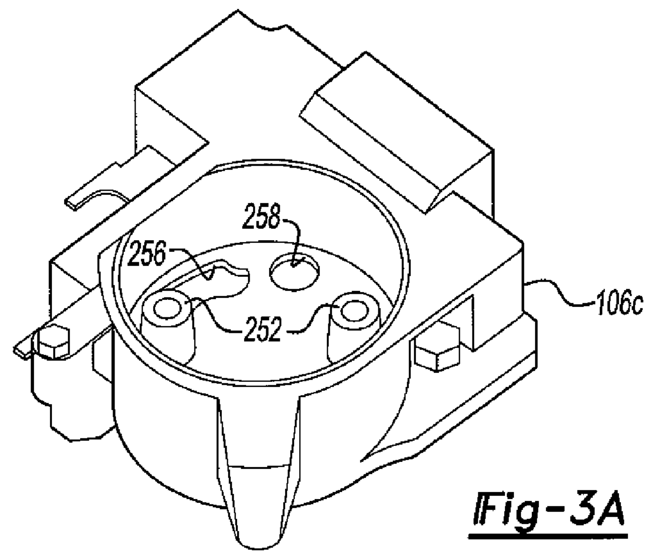
Figure 3B:
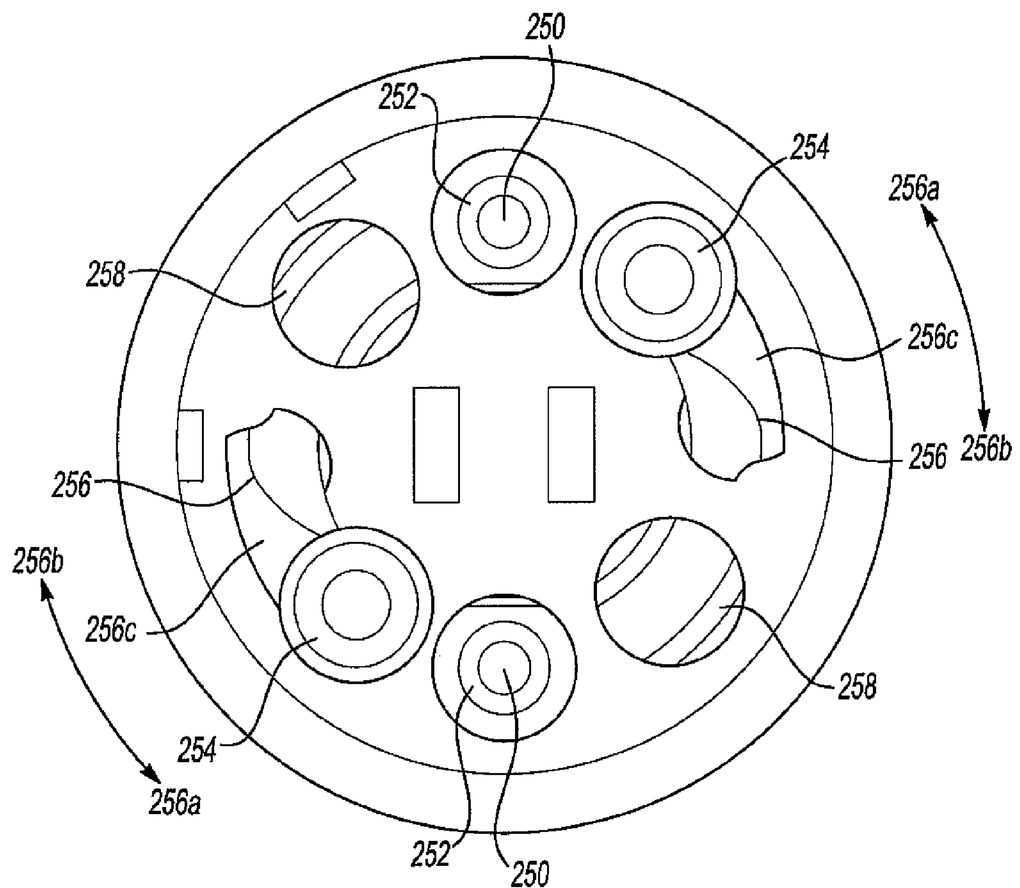
Figure 3C:
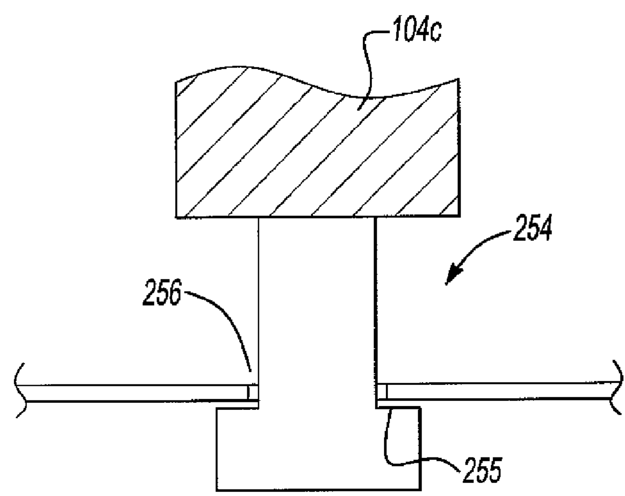
FIG. 3C illustrates an example retainer of the assembly shown in FIGS. 3A and 3B.

FIGS. 3A and 3B illustrate the disconnect assembly 100 according to another embodiment of the invention. FIG. 3A is a perspective view of an alternative handle 104*c* that is separated from an alternative housing 106*c*. For simplicity, the handle 104*c* in this embodiment collectively refers to the combined unit having the grip portion and the fuse holder. FIG. 3B is a bottom plan view (i.e., a view taken from inside the electrical storage device 102 looking upward into the housing 106*c*) when the handle 104*c* is placed inside the housing 106*c* and left into the unlocked position. In this embodiment, two high voltage pins 250 are connected to the fuse blades 121. When the handle 104*c* is inserted into the housing 106*c* in the unlocked position, the pins 250 engage with corresponding holes 252 in the housing 106*c* to form the high voltage connection. The high voltage connection itself can be, for example, a resilient connection structure made by Anphenol(R).

The handle 104*c* in this embodiment also includes a pair of retainers 254, such as T-shaped retainers, designed to engage with corresponding first openings 256 and second openings 258 in the housing. Like the previous embodiment, the handle body 112 of the handle 104*c* can be manually shifted. The retainers 254 act as the retention feature and each have a neck (not shown) so that the retainers 254 can be held securely in at least one of the openings 256, 258.

In the illustrated embodiment, each of the first openings 256 has an elongated shape so that the retainers 254 can be shifted via rotation between a first portion corresponding to the unlocked position 256*a* and a second portion corresponding to the locked position 256*b*. The second portion 256*b* may be smaller than the rest of the first opening 256 so that the first opening 256 securely holds the neck of each retainer 254 while the handle 104*c* is shifted, preventing the handle 104*c* from being lifted out of the housing 106*c* from any position other than the unlocked position during shifting. The retainers 254 may also be resiliently biased so that shifting can occur only after enough force has been applied to overcome the biasing force before the handle 104*c* shifts; thus, the retainers 254 in this case also act as the detent.

The second openings 258 correspond to the service position. As shown in FIGS. 3A and 3B, the second openings 258 are completely separate from the first openings 256, making it impossible for the handle 104*c* to be shifted from the second openings 258 to the first openings 256 without first removing the handle 104*c* from the housing 106*c*. Also, the pins 250 are disengaged from the holes 252 when the handle 104*c* is in the service position and are simply suspended freely from the fuse blades 121. Thus, the handle 104*c* must be lifted out of the housing 106*c* before the handle 104*c* can be placed into or out of the service position. As a result, when the electrical storage device 102 is shipped or serviced, the retainers 254 engage with the second openings 258 without any danger of inadvertently slipping into the first openings 256.

Figure 4A:
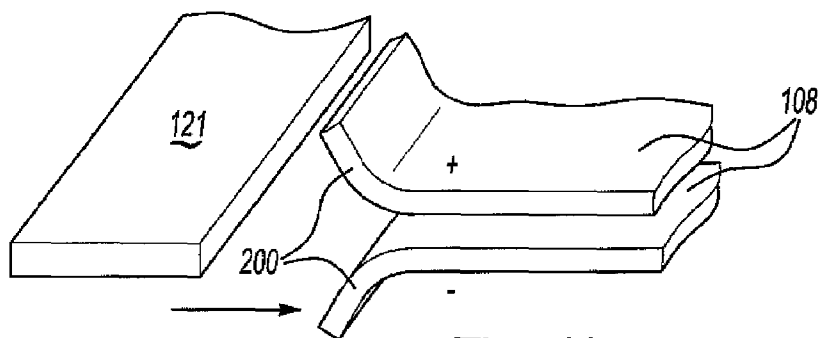
FIGS. 4A and 4B are schematic section views of a relationship between a fuse and mating terminals.
Figure 4B:
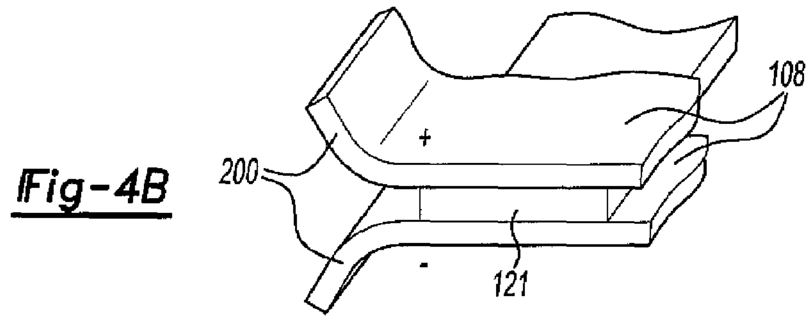

FIGS. 4A and 4B illustrate one possible relationship between the mating terminals 108 and the fuse terminals 121. FIG. 4A shows the fuse 110 in the unlocked position and FIG. 4B shows the fuse 110 in the locked position. As noted above, the mating terminals 108 include a positive terminal and a negative terminal and separate the series connections of electrochemical cells in the electrical storage device 102 into two halves that can be connected only by inserting the fuse 110 in the locked position. Dividing the series connection in half reduces the electrical potential inside the electrical storage device 102 by half when the fuse 110 is unlocked for service.

The mating terminals 108 are generally planar and arranged in a spaced relationship to form an open circuit. The mating terminals 108 may each have a bent portion 200 at one end to guide the fuse terminals 121 into a locked position. As shown in FIG. 4A, shifting the handle shifts the fuse terminals 121 toward the mating terminals 108. Once the handle and the fuse 110 are in the locked position (FIG. 4B), the mating terminals 108 are linked by the fuse terminal 121, allowing current to pass from the positive mating terminal to the negative mating terminal.

In one embodiment, the fuse terminals 121 reach the locked position only after they are positioned securely between the mating terminals 108; in other words, the locked position require more than just mere contact between the mating terminals 108 and the fuse terminals 121. This ensures that vibrations or other typical vehicle forces do not disconnect the fuse 110 unexpectedly. Moreover, it is impossible to remove the fuse 110 from the housing 106 while it is in the locked position because the fuse terminals 121 are sandwiched between the planar mating terminals 108, which prevent vertical displacement of the fuse 110. Thus, the fuse 110 can be easily removed and serviced while keeping the rest of the electrical storage device 102 intact.

Figure 5A:
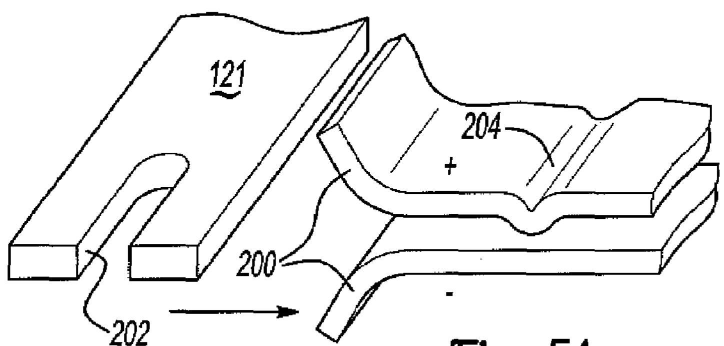
FIGS. 5A and 5B are schematic section views of another relationship between the fuse and mating terminals.
Figure 5B:
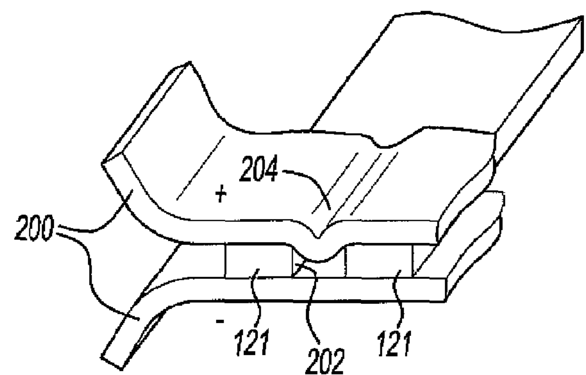

FIGS. 5A and 5B illustrate a variation of the structure shown in FIGS. 4A and 4B. In this example, the fuse terminals 121 have a notch 202 that engages with an bump 204 formed in at least one of the mating terminals 108. The relative dimensions between the bump 204 and the fuse terminals 121 are selected so that the notch 202 engages with the bump 204 without requiring excessive force. The engagement between the bump 204 and the notch 202 provides an added measure of security in the connection between the mating terminals 108 and the fuse terminals 121.

It should be understood that various alternatives to the embodiments of the invention described herein may be employed in practicing the invention. It is intended that the following claims define the scope of the invention and that the method and apparatus within the scope of these claims and their equivalents be covered thereby.

The invention claimed is:

1. A circuit disconnect assembly, comprising:

a handle that is manually shiftable within a housing of a circuit between a locked position and an unlocked position;

a fuse having a first terminal and a second terminal, wherein the first terminal and the second terminal are movable by the handle between the locked position to close the circuit and the unlocked position to open the circuit; and a detent, the detent preventing shifting of the handle until a predetermined force is applied to the handle, wherein the detent includes a pair of retainers that selectively engage with corresponding openings of the housing, and a first portion of the corresponding openings of the housing include a generally elongate shape and the pair of retainers are shiftable via rotation between the locked position and the unlocked position.

2. The assembly as recited in claim 1, wherein the handle is shiftable within the circuit via rotation.

3. The assembly as recited in claim 1, wherein the handle includes a grip portion and a fuse holder portion.

4. The assembly as recited in claim 3, wherein the fuse is at least partially enclosed by the fuse holder portion and the first terminal and second terminal remain exposed outside of the fuse holder portion.

5. The assembly as recited in claim 1, wherein the handle includes at least two high voltage pins connected to the first terminal and the second terminal, and the at least two high voltage pins are received within corresponding holes of the housing where the handle is received within the housing.

6. A circuit disconnect assembly, comprising:

a housing;

a disconnect assembly that is manually shiftable within the housing between a locked position and an unlocked position; and wherein the disconnect assembly includes at least one high voltage pin connected to a fuse the disconnect assembly being adapted to operably connect the fuse in response to shifting of the disconnect assembly between the locked position and the unlocked position, the at least one high voltage pin in communication with the electrical storage device in the locked position;

wherein the disconnect assembly includes a pair of retainers that selectively engage with corresponding openings of the housing, and a first portion of the corresponding openings of the housing include a generally elongate shape and the pair of retainers are shiftable via rotation between the locked position and the unlocked position.

7. The assembly as recited in claim 6, wherein a second portion of the corresponding openings of the housing are separate from the generally elongate shaped openings and the pair of retainers are received within the second portion of the corresponding openings in a service position.

8. The assembly as recited in claim 1, wherein a second portion of the corresponding openings of the housing are separate from the generally elongate shaped openings and the pair of retainers are received within the second portion of the corresponding openings in a service position.

9. The assembly as recited in claim 1, wherein the pair of retainers are resiliently biased to shift the handle within the housing.

10. The assembly as recited in claim 1, wherein the pair of retainers include a generally T-shaped body and include a neck that secures the pair of retainers within the corresponding openings of the housing.

11. A circuit disconnect assembly, comprising:

a housing;

a disconnect assembly that is manually shiftable within the housing between a locked position and an unlocked position; and wherein the disconnect assembly includes at least one high voltage pin connected to a fuse, the disconnect assembly being adapted to electrically connect the fuse in response to shifting of the disconnect assembly between the locked position and the unlocked position, the at least one high voltage pin in communication with the disconnect assembly in the locked position, wherein the disconnect assembly includes a pair of retainers having a generally T-shaped body.

12. The assembly as recited in claim 11, wherein the disconnect assembly is shiftable via rotation.

13. The assembly as recited in claim 11, wherein the disconnect assembly includes a grip portion and a fuse holder portion.

14. The assembly as recited in claim 6, wherein the pair of retainers are resiliently biased to shift the disconnect assembly within the housing.

* * * * *

UNITED STATES PATENT AND TRADEMARK OFFICE

CERTIFICATE OF CORRECTION

PATENT NO. : 7,530,850 B2
APPLICATION NO. : 11/761631
DATED : May 12, 2009
INVENTOR(S) : Maguire et al.

It is certified that error appears in the above-identified patent and that said Letters Patent is hereby corrected as shown below:

Claim 6, Column 6, Line 52-53

Change "electrical storage device" to "circuit disconnect assembly"

Signed and Sealed this

Fourth Day of August, 2009

JOHN DOLL

*Acting Director of the United States Patent and Trademark Office*